US012804666B2

(12) United States Patent
Zhao et al.

(10) Patent No.: US 12,804,666 B2
(45) **Date of Patent: *Nov. 17, 2026**

(54) DATA TRANSMISSION METHOD, CONTROL INFORMATION SENDING METHOD, AND DEVICE

(71) Applicant: HUAWEI TECHNOLOGIES CO., LTD., Shenzhen (CN)

(72) Inventors: Yue Zhao, Shenzhen (CN); Wenping Bi, Shenzhen (CN); Yubo Yang, Shanghai (CN); Xingqing Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 306 days.

This patent is subject to a terminal disclaimer.

(21) Appl. No.: 18/598,203

(22) Filed: Mar. 7, 2024

(65) Prior Publication Data

US 2024/0215043 A1 Jun. 27, 2024

Related U.S. Application Data

(63) Continuation of application No. 17/200,186, filed on Mar. 12, 2021, now Pat. No. 11,956,792, which is a (Continued)

(51) Int. Cl.
*H04W 72/23* (2023.01)
*H04L 1/00* (2006.01)
(Continued)

(52) U.S. Cl.
CPC ........... *H04W 72/23* (2023.01); *H04L 1/0013* (2013.01); *H04L 5/0053* (2013.01); *H04W 4/70* (2018.02)

(58) Field of Classification Search
CPC ...... H04W 72/23; H04W 4/70; H04L 1/0013; H04L 5/0053
See application file for complete search history.

(56) References Cited

U.S. PATENT DOCUMENTS 10,993,221 B2 4/2021 Hwang et al.
2016/0014676 A1 1/2016 Taneja
(Continued)

FOREIGN PATENT DOCUMENTS

CN 107889268 A 4/2018
CN 108347318 A 7/2018
(Continued)

OTHER PUBLICATIONS

Huawei, HiSilicon, DL URLLC multiplexing considerations. 3GPP TSG RAN WG1 Meeting #87, Reno, USA Nov. 14-18, 2016, R1-1611222, 8 pages.

*Primary Examiner* — Duc C Ho
(74) *Attorney, Agent, or Firm* — WOMBLE BOND DICKINSON (US) LLP

(57) ABSTRACT

Embodiments of this application disclose a data transmission method, a control information sending method, and a device, and relate to the field of communications technologies. The method may include: determining, by the communications device, a first resource used for receiving or sending data; receiving control information, where the control information includes first indication information that can be used to indicate that a resource is punctured or postponed, and where the first indication information is used to indicate that a second resource is punctured or postponed; and determining, by the communications device, a third resource based on the first indication information and the first resource, and receiving or sending the data by using the third resource.

14 Claims, 8 Drawing Sheets

Related U.S. Application Data continuation of application No. PCT/CN2018/105768, filed on Sep. 14, 2018.

(51) Int. Cl.

| | |
|---|---|
| ***H04L 5/00*** | (2006.01) |
| *H04W 4/70* | (2018.01) |

(56) References Cited

U.S. PATENT DOCUMENTS

| | | | |
|---|---|---|---|
| 2017/0273056 | A1 | 9/2017 | Papasakellariou |
| 2017/0311292 | A1 | 10/2017 | Choi et al. |
| 2018/0070341 | A1 | 3/2018 | Islam et al. |
| 2018/0115964 | A1 | 4/2018 | Lin et al. |
| 2019/0045400 | A1 | 2/2019 | Li et al. |
| 2019/0281621 | A1 | 9/2019 | Noh et al. |
| 2019/0327751 | A1 | 10/2019 | Dong et al. |
| 2020/0162220 | A1 | 5/2020 | Yang |
| 2020/0374846 | A1* | 11/2020 | Zhao ..................... H04L 5/1469 |
| 2023/0039648 | A1* | 2/2023 | Wang .................... H04L 1/1822 |

FOREIGN PATENT DOCUMENTS

| | | | |
|---|---|---|---|
| CN | 108430106 | A | 8/2018 |
| WO | 2018127032 | A1 | 7/2018 |
| WO | 2018128029 | A1 | 7/2018 |
| WO | 2018143689 | A1 | 8/2018 |

* cited by examiner

DATA TRANSMISSION METHOD, CONTROL INFORMATION SENDING METHOD, AND DEVICE

CROSS-REFERENCE TO RELATED APPLICATIONS

This application is a continuation of U.S. patent application Ser. No. 17/200,186, filed on Mar. 12, 2021, which is a continuation of International Application No. PCT/CN2018/105768, filed on Sep. 14, 2018. All of the afore-mentioned patent applications are hereby incorporated by reference in their entireties.

TECHNICAL FIELD

This application relates to the field of communications technologies, and in particular, to a data transmission method, a control information sending method, and a device.

BACKGROUND

In a communications system, for example, in a long term evolution (LTE) system, a standard supports repeated transmission of a transport block (TB) for a plurality of times. To be specific, one piece of downlink control information (DCI) may be used to schedule one TB for repeated transmission in a plurality of subframes, and a quantity of repetitions is configured by a base station. To reduce control channel overheads caused by repeated transmission, one piece of DCI may further be used to schedule transmission of a plurality of TBs.

When one piece of DCI is used to schedule repeated transmission of one or more TBs, especially when a quantity of repetitions is relatively large, the base station pre-allocates a resource of a very long time to one user equipment (UE). For example, a quantity of repetitions of one TB is 2048, and one repetition requires 1 millisecond. When one piece of DCI is used to schedule N TBs, it means that a resource of a time about 2*N seconds is pre-allocated to one UE by using the DCI. In this period, if UE with a higher priority requests a resource, how to ensure a service of the UE with a higher priority and ensure that the UE that currently reserves a resource can correctly parse data is a problem that needs to be resolved.

SUMMARY

Embodiments of this application provide a data transmission method, a control information sending method, and a device. If UE with a higher priority exists in TB repeated transmission of current UE, not only a service of the UE with a higher priority can be ensured, but also it is ensured that the current UE can correctly receive or send data.

To achieve the foregoing objective, the following technical solutions are used in the embodiments of this application.

According to a first aspect, this application provides a data transmission method and a communications device.

In an embodiment, the method may include: The communications device determines a first resource used for receiving or sending data. The communications device receives control information, where the control information includes first indication information that can be used to indicate that a resource is punctured or postponed, the first indication information is used to indicate that a second resource is punctured or postponed, and the second resource is a part of the first resource. The communications device determines a third resource based on the first indication information and the first resource, and receives or sends the data by using the third resource. In the method, the control information indicates that a resource of current UE occupied by UE with a higher priority is punctured or postponed. The UE may determine, based on the control information, a resource used by the UE to receive or send the data, to ensure that the current UE can correctly receive or send the data, and correspondingly ensure that a base station correctly receives the data. In addition, the punctured or postponed resource is used by the UE with a higher priority to transmit the data, so that a service of the UE with a higher priority can be ensured.

In an embodiment, when the first indication information is used to indicate that the second resource is punctured, that the communications device determines a third resource based on the first indication information and the first resource includes: The communications device determines that the third resource is a resource other than the second resource in the first resource. In this embodiment, if the first indication information indicates that the second resource is punctured, the resource used for receiving and sending data does not include the punctured resource. When receiving data, the UE does not consider data transmitted on the punctured resource, and when sending data, the UE does not send the data on the punctured resource.

In an embodiment, when the first indication information is used to indicate that the second resource is postponed, that the communications device determines a third resource based on the first indication information and the first resource includes: The communications device determines that the third resource includes a resource other than the second resource in the first resource and a fourth resource that follows the first resource and has a same size as the second resource. In this embodiment, if the first indication information indicates that the second resource is postponed, the resource used for receiving and sending the data does not include the second resource, data transmitted on the second resource is postponed to another available resource for transmission, and data transmission performance of the UE is not affected.

In an embodiment, the control information further includes second indication information. The second indication information is used to indicate the second resource. In this embodiment, the second resource is indicated by a first communications device. In an embodiment, the second indication information may indicate a start moment of the second resource, and a time domain length of the second resource is a preset value. In another embodiment, the second indication information may be used to indicate a time domain length of the second resource, and a start moment of the second resource is predefined. In another embodiment, the second indication information may be used to indicate a start moment and a time domain length of the second resource.

In an embodiment, that the communications device receives the control information includes: The communications device detects the control information in at least one detection position of the control information, and the at least one detection position is related to a start position of a first subframe in the first resource. In this embodiment, the detection position of the control information is configured by a base station or predefined.

In another possible design, the at least one detection position is periodic and is unrelated to a position of the first resource. In this embodiment, a detection period may be configured by a base station or predefined.

In an embodiment, a start moment of the second resource is a first time at which the communications device receives the control information, or a second time after the first time. In this embodiment, the start moment of the second resource is predefined, and a time domain length of the second resource may be configured by a base station or predefined.

In an embodiment, the time domain length may be a quantity of subframes.

In an embodiment, the control information is carried on an MPDCCH.

Correspondingly, this application further provides a communications device. The communications device may implement the data transmission method according to the first aspect. For example, the communications device may be a network device or UE, or may be another apparatus that can implement the foregoing data transmission method. The apparatus may implement the foregoing method by using software or hardware, or by executing corresponding software by hardware.

In an embodiment, the communications device may include a processor and a memory. The processor is configured to support the communications device in performing a corresponding function in the method according to the first aspect. The memory is configured to be coupled to the processor, and store program instructions and data that are necessary for the communications device. In addition, the communications device may further includes a communications interface. The communications interface is configured to support communication between the communications device and another apparatus. The communications interface may be a transceiver or a transceiver circuit.

In an embodiment, the communications device may include: a processing module, a receiving module, and a sending module. The processing module is configured to determine a first resource used for receiving or sending data. The receiving module is configured to receive control information, where the control information includes first indication information that can be used to indicate that a resource is punctured or postponed, the first indication information is used to indicate that a second resource is punctured or postponed, and the second resource is a part of the first resource. The processing module is further configured to determine a third resource based on the first indication information and the first resource. The receiving module is further configured to receive the data by using the third resource. Or the sending module is configured to send the data by using the third resource.

In an embodiment, when the first indication information is used to indicate that the second resource is punctured, that the processing module determines the third resource based on the first indication information and the first resource includes: The processing module determines that the third resource is a resource other than the second resource in the first resource.

In an embodiment, when the first indication information is used to indicate that the second resource is postponed, that the processing module determines the third resource based on the first indication information and the first resource includes: The processing module determines that the third resource includes a resource other than the second resource in the first resource and a fourth resource that follows the first resource and has a same size as the second resource.

In an embodiment, the receiving module is configured to detect the control information in at least one detection position of the control information, and the at least one detection position is related to a start position of a first subframe in the first resource.

For definitions of the control information and the start moment of the second resource, refer to corresponding descriptions on the foregoing method side. Details are not described herein again.

According to a second aspect, this application provides a control information sending method and a communications device.

In an embodiment, the method may include: The communications device determines first control information, where the first control information is used to indicate a first resource used for receiving or sending data. The communications device sends the first control information. The communications device determines second control information, where the second control information includes first indication information that can be used to indicate that a resource is punctured or postponed, the first indication information is used to indicate that a second resource is punctured or postponed, and the second resource is a part of the first resource. The communications device sends the second control information. In the method, the second control information indicates that a resource of current UE occupied by UE with a higher priority is punctured or postponed. The UE may determine, based on the second control information, a resource used by the UE to receive or send the data, to ensure that the current UE can correctly receive or send the data. In addition, the punctured or postponed resource is used by the UE with a higher priority to transmit the data, so that a service of the UE with a higher priority can be ensured.

In an embodiment, when the first indication information is used to indicate that the second resource is punctured, a third resource used for receiving or sending the data is a resource other than the second resource in the first resource. In this embodiment, if the first indication information indicates that the second resource is punctured, the resource used for receiving and sending the data does not include a punctured resource, and the punctured resource is a resource that does not affect data transmission performance of the UE.

In an embodiment, when the first indication information is used to indicate that the second resource is postponed, a third resource used for receiving or sending the data includes a resource other than the second resource in the first resource and a fourth resource that follows the first resource and has a same size as the second resource. In this embodiment, if the first indication information is used to indicate that the second resource is postponed, a resource used for receiving or sending the data does not include the second resource, data transmitted on the second resource is postponed to a resource that follows the first resource and has a same size as the second resource for transmission, and the data transmission performance of the UE is not affected.

In an embodiment, the second control information further includes second indication information. The second indication information is used to indicate the second resource. In this embodiment, the second resource is indicated by a communications device. In an embodiment, the second indication information may indicate a start moment of the second resource, and a time domain length of the second resource is a preset value. In another embodiment, the second indication information may be used to indicate a time domain length of the second resource, and a start moment of the second resource is predefined. In another embodiment, the second indication information may be used to indicate a start moment and a time domain length of the second resource.

In an embodiment, the second control information corresponds to at least one detection position, and the at least one detection position is related to a start position of the first subframe in the first resource. That the communications device sends the second control information includes: sending the second control information at one or more detection positions in the at least one detection position. In this embodiment, the detection position of the control information is configured by a base station or predefined.

In another possible design, the at least one detection position is periodic and is unrelated to a position of the first resource. In this embodiment, a detection period may be configured by a base station or predefined.

In an embodiment, a start moment of the second resource is a first time at which a receive end device receives the second control information, or a second time after the first time. In this embodiment, the start moment of the second resource is predefined, and the time domain length of the second resource may be configured by the base station or predefined.

In an embodiment, the time domain length may be a quantity of subframes.

In an embodiment, the second control information is carried on an MPDCCH.

Correspondingly, this application further provides a communications device. The communications device may implement the control information sending method according to the second aspect. For example, the communications device may be a network device or UE, or may be another apparatus that can implement the foregoing control information sending method. The communications device may implement the foregoing method by using software or hardware, or by executing corresponding software by hardware.

In an embodiment, the communications device may include a processor and a memory. The processor is configured to support the communications device in performing a corresponding function in the method according to the second aspect. The memory is configured to be coupled to the processor, and store program instructions and data that are necessary for the communications device. In addition, the communications device may further includes a communications interface. The communications interface is configured to support communication between the communications device and another apparatus. The communications interface may be a transceiver or a transceiver circuit.

In an embodiment, the communications device may include: a processing module and a sending module.

The processing module is configured to determine first control information, where the first control information is used to indicate a first resource used for receiving or sending data. The sending module is configured to send the first control information. The processing module is further configured to determine second control information, where the second control information includes first indication information that can be used to indicate that a resource is punctured or postponed, the first indication information is used to indicate that a second resource is punctured or postponed, and the second resource is a part of the first resource. The sending module is further configured to send the second control information.

In an embodiment, when the first indication information is used to indicate that the second resource is punctured, a third resource used for receiving or sending the data is a resource other than the second resource in the first resource.

In an embodiment, when the first indication information is used to indicate that the second resource is postponed, a third resource used for receiving or sending the data includes a resource other than the second resource in the first resource and a fourth resource that follows the first resource and has a same size as the second resource.

For definitions of the second control information and the start moment of the second resource, refer to corresponding descriptions of the foregoing method side. Details are not described herein again.

This application further provides a computer-readable storage medium. The computer-readable storage medium stores an instruction. When the instruction is run on a computer, the computer is enabled to perform the method according to any one of the foregoing aspects.

This application further provides a computer program product including an instruction. When the computer program product runs on a computer, the computer is enabled to perform the method according to any one of the foregoing aspects.

This application provides a communications system, including the communications device configured to implement the method according to the first aspect, and the communications device configured to implement the method according to the second aspect.

This application further provides a chip system. The chip system includes a processor. The chip may further include a memory, and is configured to implement the method according to any one of the foregoing aspects.

Any communications device, computer storage medium, computer program product, chip system, or communications system provided above is configured to perform the corresponding method provided above. Therefore, beneficial effects that can be achieved by the communications device, computer storage medium, computer program product, chip system, or communications system provided above, refer to beneficial effects of a corresponding solution in the corresponding method provided above. Details are not described herein again.

BRIEF DESCRIPTION OF DRAWINGS

FIG. 5-1 is a schematic diagram 2 of a data transmission method and a control information sending method according to an embodiment of this application;

FIG. 5-2 is a schematic diagram 3 of a data transmission method and a control information sending method according to an embodiment of this application;

FIG. 5-3 is a schematic diagram 4 of a data transmission method and a control information sending method according to an embodiment of this application;

FIG. 5-4 is a schematic diagram 5 of a data transmission method and a control information sending method according to an embodiment of this application;

FIG. 6-1 is a schematic diagram 6 of a data transmission method and a control information sending method according to an embodiment of this application;

FIG. 6-2 is a schematic diagram 7 of a data transmission method and a control information sending method according to an embodiment of this application;

DESCRIPTION OF EMBODIMENTS

The following describes in detail a data transmission method, a control information sending method and a device provided in the embodiments of this application with reference to the accompanying drawings.

The technical solutions provided in this application may be used for various communications systems, for example, current 3G and 4G communications systems, and a future evolved network, for example, a 5G communications system. For example, the communications systems include a wideband code division multiple access (WCDMA) mobile communications system, a time division-synchronous code division multiple access (TD-SCDMA) communications system, a long term evolution (LTE) system, an advanced long term evolution (LTE-A) system, a new radio (NR) system, a cellular system related to the 3rd generation partnership project (3GPP), a plurality of types of communication convergence systems, and another such communication system. A plurality of application scenarios may be included, for example, including machine to machine (M2M), device to machine (D2M), macro-micro communication, enhanced mobile broadband (eMBB), ultra-reliable and low-latency communication (uRLLC), and scenarios such as massive machine type communication (mMTC). These scenarios may include but are not limited to: a scenario of communication between user equipment (UE) and UE, a scenario of communication between network devices, a scenario of communication between a network device and UE, and the like.

Figure 1:
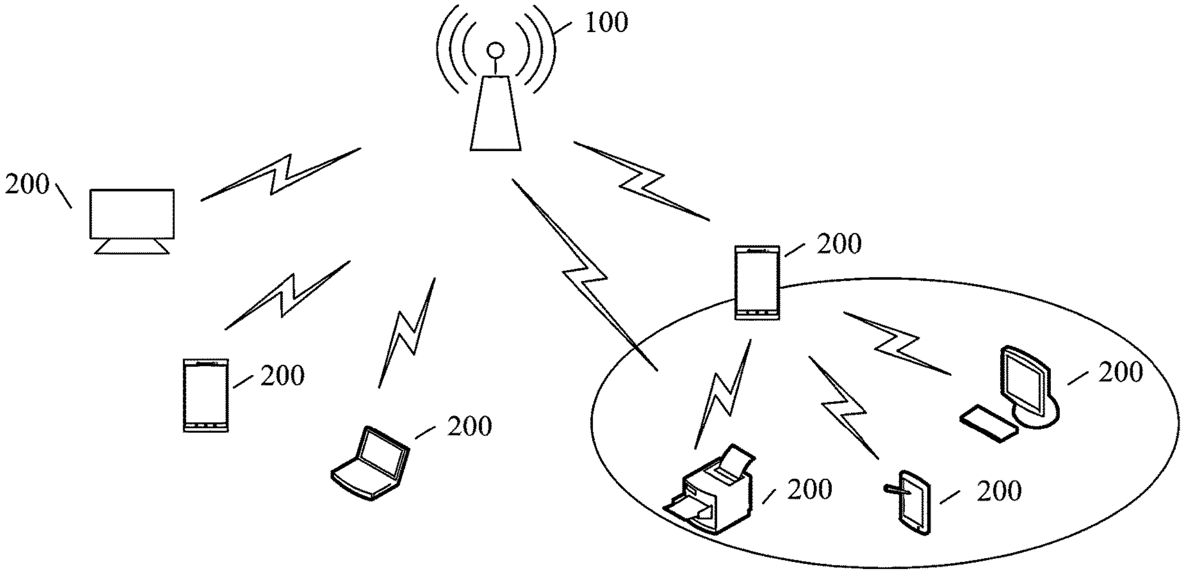
FIG. 1 is a schematic diagram of a system architecture applicable to a technical solution according to an embodiment of this application.

The technical solutions provided in the embodiments of this application may be used for a system architecture shown in FIG. 1. The system architecture may include a network device 100 and one or more UEs 200 connected to the network device 100.

The network device 100 may be a device that can communicate with the UE 200. The network device 100 may be an eNB (evolutional NodeB) or an eNodeB in an LTE. The network device 100 may also be a relay station, an access point, or the like. Alternatively, the network device 100 may further be a radio controller in a cloud radio access network (CRAN) scenario. The network device 100 may further be a network device in a future 5G network or a network device in a future evolved network, or may further be a wearable device, a vehicle-mounted device, or the like.

The UE 200 may be an internet of things terminal, an access terminal, a UE unit, a UE station, a mobile station, a mobile console, a remote station, a remote terminal, a mobile device, a UE terminal, a terminal, a wireless communications device, a UE agent, a UE apparatus, or the like. The internet of things terminal implements functions of collecting data and sending data to the network device 100, and is responsible for multiple functions such as data collection, preliminary processing, encryption, and transmission. The internet of things terminal can be a shared bicycle, a water meter, an electricity meter, a street lamp, a fire alarm device, a manhole cover, a gas station, a high-speed railway, a printer, or the like. The access terminal may be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a terminal in a future 5G network, a terminal in a future evolved network, or the like.

One or more of the UEs 200 may serve as a relay or transit device for another UE, and forward, to the another UE, a message sent by the network device 100. The UE 200 may also send scheduling information to one or more other UE.

It should be noted that the system architecture shown in FIG. 1 is merely used as an example, and is not intended to limit the technical solutions in this application. A person skilled in the art should understand that, in an implementation process, the system architecture may further include another device, and the network device 100 and the UE 200 may be configured based on a specific requirement.

Figure 2:
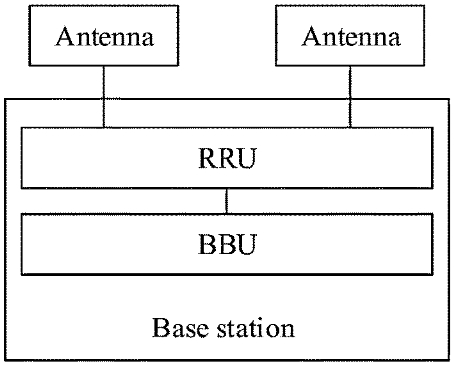
FIG. 2 is a schematic structural diagram of a network device applicable to a technical solution according to an embodiment of this application.

In an example, an example in which the network device 100 is a base station is used to describe a general-purpose hardware architecture of the network device 100. As shown in FIG. 2, a base station may include a building baseband unit (BBU) and a remote radio unit (RRU). The RRU is connected to an antenna feeder system (namely, an antenna). The BBU and the RRU may be separately used as needed. It should be noted that in an implementation, the network device 100 may alternatively use another general-purpose hardware architecture, and the another general-purpose hardware architecture is not merely limited to the general-purpose hardware architecture shown in FIG. 2.

In an example, the network device 100 or the UE 200 in FIG. 1 may be implemented by one physical device, or may be jointly implemented by a plurality of physical devices, or may be a logical function module in one physical device. This is not limited in this embodiment of this application.

Figure 3:
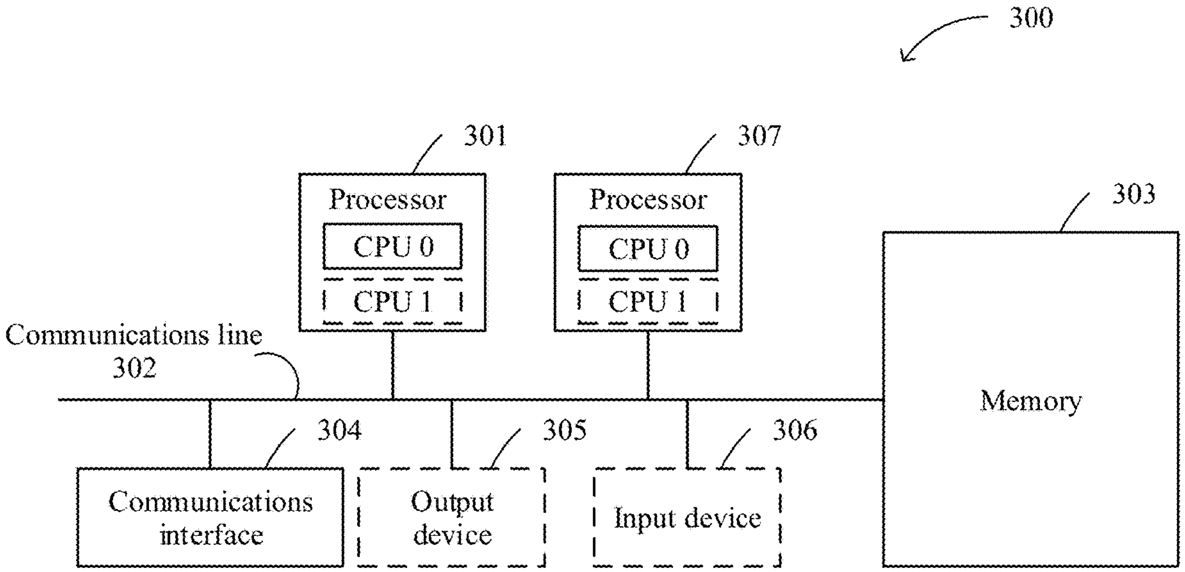
FIG. 3 is a schematic structural diagram of a communications device applicable to a technical solution according to an embodiment of this application.

For example, the network device 100 or the UE 200 in FIG. 1 may be implemented by using the communications device in FIG. 3. FIG. 3 is a schematic diagram of a hardware structure of a communications device according to an embodiment of this application. The communications device 300 includes at least one processor 301, a communications line 302, a memory 303, and at least one communications interface 304.

The processor 301 may be a general-purpose central processing unit (CPU), a microprocessor, an application-specific integrated circuit (ASIC), or one or more integrated circuits configured to control program execution of the solutions of this application.

The communications line 302 may include a path for transmitting information between the foregoing components.

The communications interface 304 uses any apparatus such as a transceiver and is configured to communicate with another device or a communications network such as an Ethernet, a radio access network (RAN), or a wireless local area network (WLAN).

The memory 303 may be a read-only memory (ROM) or another type of static storage device that can store static information and an instruction, or a random access memory (RAM) or another type of dynamic storage device that can store information and an instruction, or may also be an electrically erasable programmable read-only memory (EEPROM), a compact disc read-only memory (CD-ROM) or another compact disc storage, an optical disc storage (including a compact disc, a laser disc, an optical disc, a digital versatile disc, a blu-ray optical disc, or the like), a magnetic disk storage medium or another magnetic storage device, or any other computer-accessible medium that can be used to carry or store expected program code in an instruction or a data structure form, without being limited thereto though. The memory 303 may exist independently, and is connected to the processor 301 through the communications line 302. Alternatively, the memory 303 may be integrated with the processor 301.

The memory 303 is configured to store a computer-executable instruction for executing the solutions of this application, and the processor 301 controls the execution. The processor 301 is configured to execute the computer-executable instruction stored in the memory 303, to implement the data transmission method and the control information sending method provided in the following embodiments of this application.

Optionally, the computer-execution instruction in this embodiment of this application may also be referred to as an application program code. This is not limited in this embodiment of this application.

In an embodiment, in an embodiment, the processor 301 may include one or more CPUs, for example, the CPU 0 and the CPU 1 in FIG. 3.

In an embodiment, in an embodiment, the communications device 300 may include a plurality of processors, for example, the processor 301 and a processor 307 in FIG. 3. Each of the processors may be a single-core (single-CPU) processor or a multi-core (multi-CPU) processor. The processor herein may be one or more devices, circuits, and/or processing cores configured to process data (for example, a computer program instruction).

In an embodiment, in an embodiment, the communications device 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, a projector or the like. The input device 306 communicates with the processor 301, and may receive an input of a user in a plurality of manners. For example, the input device 306 may be a mouse, a keyboard, a touchscreen device, or a sensing device.

The following explains and describes some terms in this application.

1. Resource

In this application, a resource is used for signaling and data transmission between communications devices. For example, a base station and UE may perform wireless communication by using an air interface resource. The air interface resource may include a time domain resource and a frequency domain resource. The time domain resource and the frequency domain resource may also be referred to as a time-frequency resource. The frequency domain resource may be located in a specified frequency range. The frequency range may also be referred to as a frequency band. A center point of the frequency domain resource may be referred to as a center frequency point. A width of the frequency domain resource may be referred to as bandwidth (BW). The time domain resource represents resource division on a time axis, and may include different division granularities. For example, one subframe may be used as one time domain resource unit, one slot may be used as one time domain resource unit, or one orthogonal frequency division multiplexing (OFDM) symbol may be used as one time domain resource unit.

2. The term "a plurality of" in this specification means two or more. In this specification, the terms "first" and "second" are used to distinguish between different objects, but are not used to describe a specific order of the objects. For example, "first indication information" and "second indication information" are used to distinguish between different indication information, but are not used to describe a particular order of the indication information. The term "and/or" in this specification is only an association relationship for describing associated objects and represents that there may be three relationships. For example, A and/or B may represent the following three cases: Only A exists, both A and B exist, and only B exists.

In the embodiments of this application, the words such as "example" or "for example" are used to represent giving an example, an illustration, or a description. Any embodiment or design scheme described as "example" or "for example" in the embodiments of this application should not be explained as being more preferred or having more advantages than another embodiment or design scheme. Exactly, use of the word such as "example" or "for example" is intended to present a related concept in a specific manner.

Embodiments of this application provide a data transmission method and a control information sending method, which are used for a system architecture shown in FIG. 1. A first communications device sends control information to schedule a second communications device, and after receiving the control information, the second communications device performs data transmission based on the control information. This application provides a control information sending method, which is used for a first communications device. This application provides a data transmission method, which is used for a second communications device. The first communications device may be the network device 100 or the UE 200 in FIG. 1. The second communications device may be the UE 200 in FIG. 1. In this embodiment of this application, an example in which the first communications device is a base station and the second communications device is UE is used for description. Certainly, in actual application, the first communications device and the second communications device may be devices in another form. For example, the first communications device may be UE. This is not limited in this embodiment of this application.

In the data transmission method and the control information sending method in the embodiments of this application, a specific structure of an execution body of the first communications device or the second communications device is not specially limited in this embodiment of this application, provided that a program that records code of the data transmission method and the control information sending method in the embodiments of this application can be run to perform communication according to the data transmission method and the control information sending method in the embodiments of this application. For example, the data transmission method provided in this embodiment of this application may be performed by UE, or a function module in the UE that can invoke and execute a program, or an apparatus used in the UE, for example, a chip. The control information sending method provided in this embodiment of this application may be executed by a base station, a function module that can invoke and execute a program in the base station, or an apparatus used in the base station, for example, a chip. This is not limited in this application. In this specification, an example in which the base station performs the foregoing control information sending method and the UE performs the foregoing data transmission method is used for description.

Figure 4:
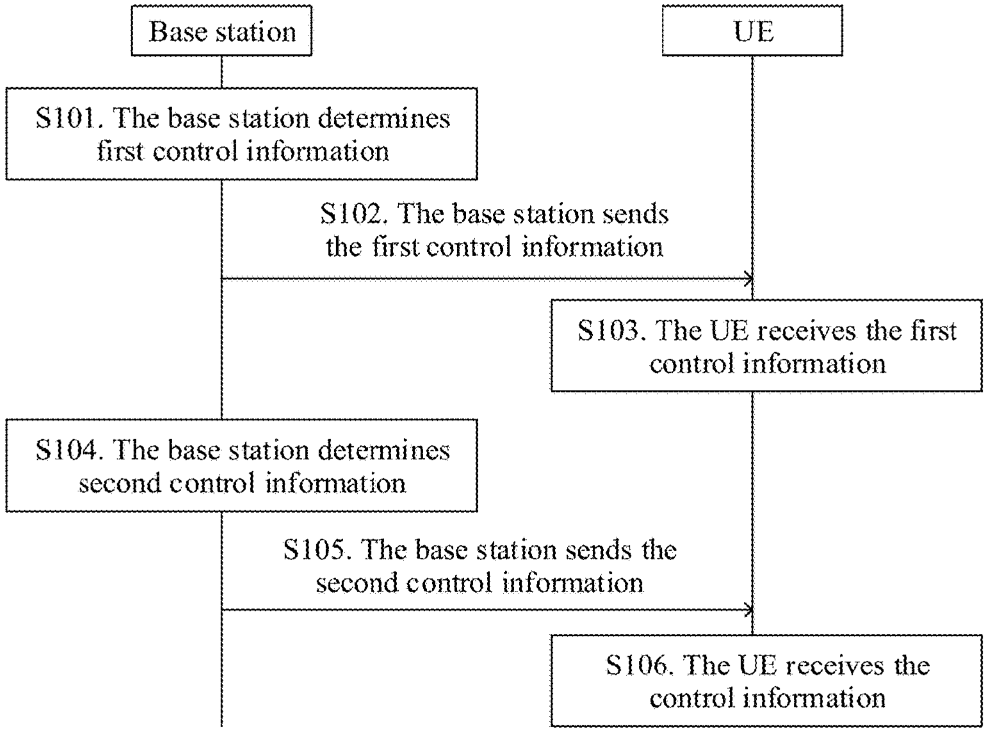
FIG. 4 is a schematic diagram 1 of a data transmission method and a control information sending method according to an embodiment of this application.

Embodiments of this application provide a data transmission method and a control information sending method, which are used for the system architecture shown in FIG. 1, so that if UE with a higher priority exists in TB repeated transmission of current UE, not only a service of the UE with a higher priority can be ensured, but also it is ensured that the current UE can correctly receive or send data, and data receiving performance of a base station can be correspondingly ensured. As shown in FIG. 4, the method may include S101 to S106.

S101. A base station determines first control information.

The base station determines the first control information. The first control information is used to indicate a first resource used by UE for receiving or sending data.

For example, the base station may schedule the UE by sending control information, to indicate the UE to receive or send data on some resources. For example, the base station may schedule, by using one piece of DCI, one TB to be repeatedly transmitted on a plurality of resources, and the one piece of DCI is one piece of control information. For example, in LTE, the DCI is carried on a physical downlink control channel (PDCCH). In an internet of things, the DCI is carried on a machine type physical downlink control channel (MPDCCH). If one TB is scheduled by one piece of DCI to be repeatedly transmitted on a plurality of resources, the PDCCH or the MPDCCH carrying the DCI may also be repeatedly transmitted on the plurality of resources, and a quantity of repetitions may be configured by the base station. In an embodiment, one piece of DCI may alternatively schedule a plurality of TBs for repeated transmission.

Figures 1, 5:
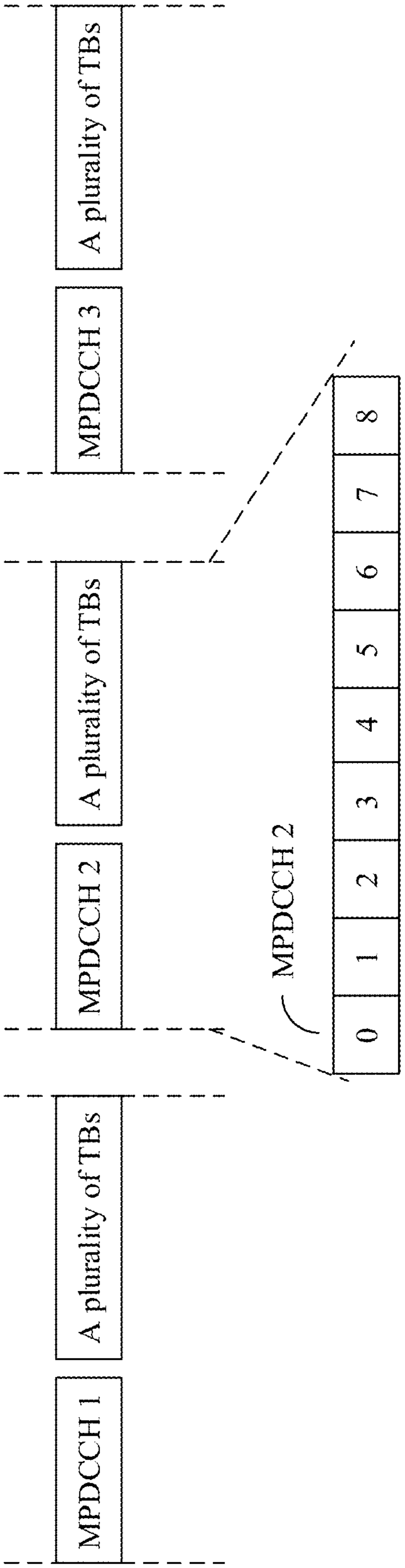
Figures 2, 5:
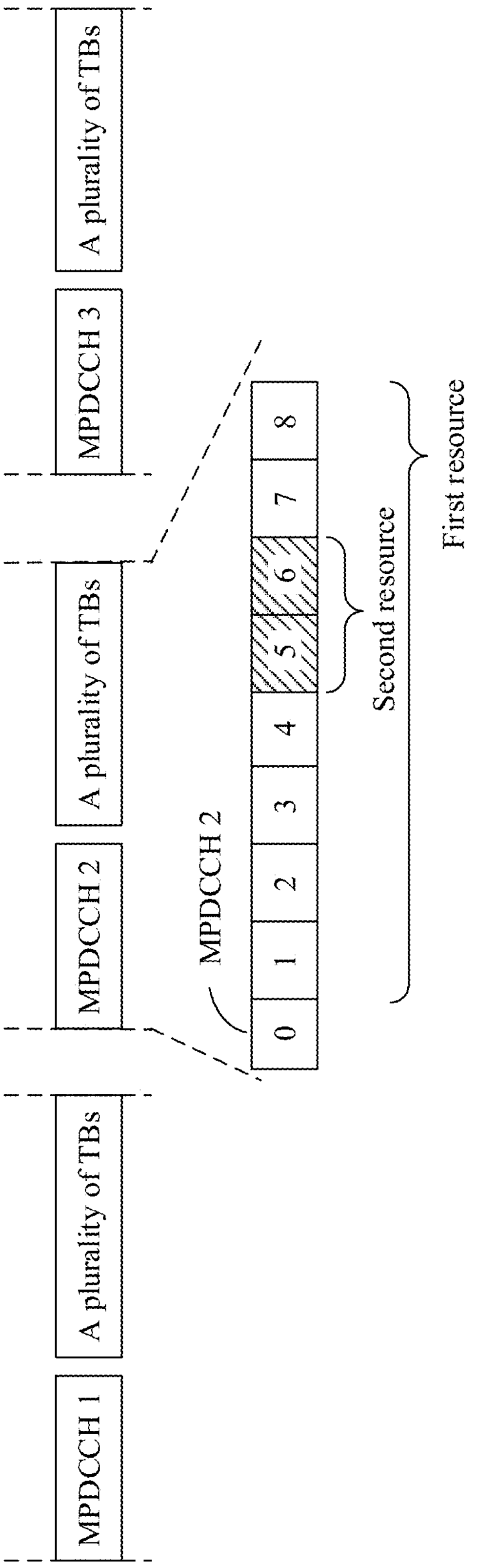
Figures 3, 5:
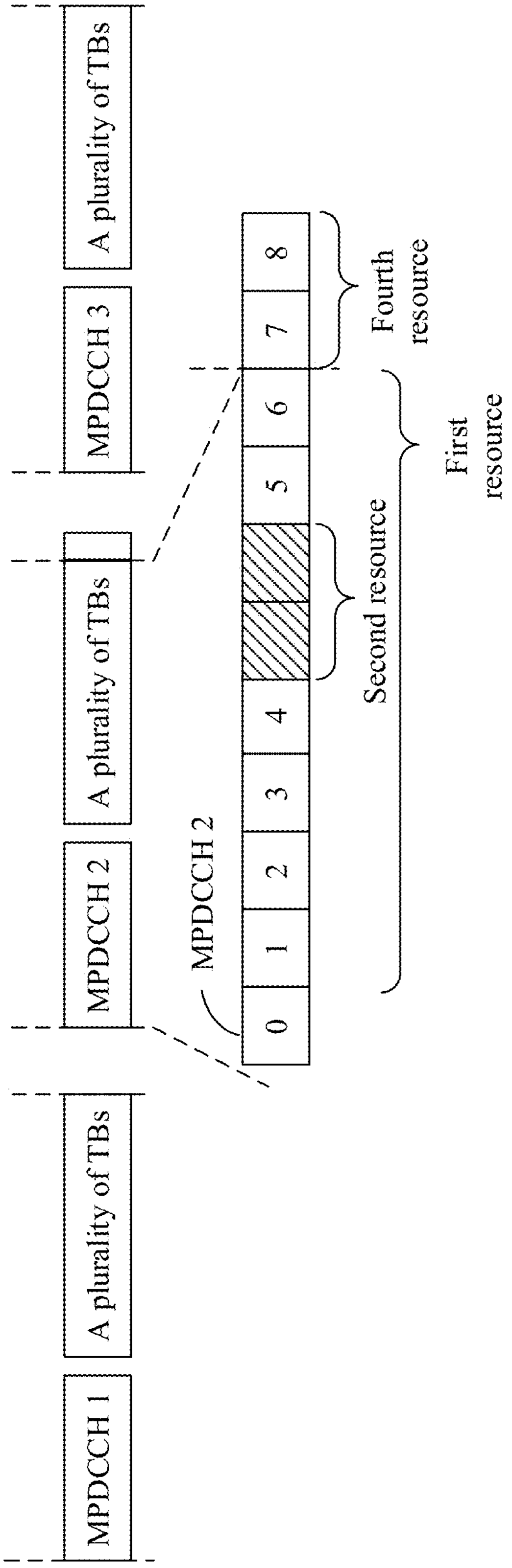
Figures 4, 5:
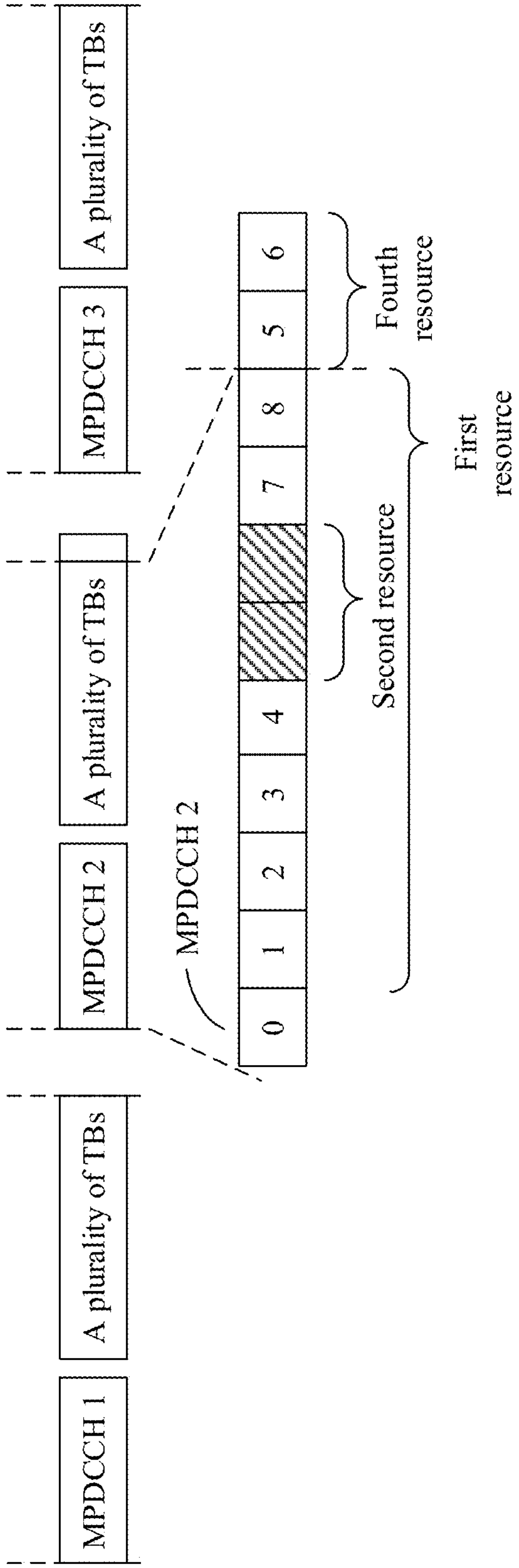

For example, as shown in FIG. 5-1, DCI carried on an MPDCCH schedules a plurality of TBs for repeated transmission, and the MPDCCH may be repeatedly transmitted in a plurality of subframes. For example, a base station determines that DCI carried on an MPDCCH 2 schedules UE to receive or send data in a subframe 1 to a subframe 8. In other words, first control information is the DCI carried on the MPDCCH 2, and is used to indicate that a first resource used by the UE for receiving or sending data is the subframe 1 to the subframe 8.

S102. The base station sends the first control information.

The base station sends the first control information to the UE.

S103. The UE receives the first control information.

The UE receives the first control information from the base station, and determines, based on the first control information, the first resource used for receiving or sending data.

S104. The base station determines second control information.

In a process in which the base station schedules one or more TBs of one UE for repeated transmission, a resource used for repeated transmission of the one or more TBs is reserved for the current UE. That is, the first resource is reserved for the current UE. If UE with a higher priority requests a resource, the base station may allocate, to the UE with a higher priority, a part of the resource reserved for the repeated transmission of the TBs of the current UE. The resource occupied by the UE with a higher priority is a second resource. The second resource is a part of the first resource. For example, as shown in FIG. 5-2, the first resource that is reserved for the current UE and that is used to receive or send data is the subframe 1 to the subframe 8. The base station allocates the subframe 5 and the subframe 6 to another UE with a higher priority, and the second resource is the subframe 5 and the subframe 6.

In an embodiment, the base station may determine, based on a TB configuration, that the second resource is punctured (puncture) or postponed (postpone). For example, if a proportion of the second resource to the first resource is greater than or equal to a preset threshold, it is determined that the second resource is postponed; or if a proportion of the second resource to the first resource is less than a preset threshold, it is determined that the second resource is punctured. For example, the preset threshold is 50%, the first resource is eight subframes, and the second resource is six subframes. If an occupied resource is greater than the preset threshold, final decoding performance of the UE is affected. In this case, it is determined that the second resource is postponed. The first resource is eight subframes, the second resource is two subframes, and a proportion of an occupied resource in the first resource is relatively small. The base station may consider that decoding of the UE is not affected, and determine that the second resource is punctured. For example, it is determined, based on the quantity of repetitions of repeated transmission of the TB and the time domain length of the second resource, that the second resource is punctured or postponed. For transmission of a TB with a relatively small quantity of repetitions, a probability that the decoding performance of the UE is affected is high, and it is determined that the second resource is postponed. For transmission of a TB with a relatively large quantity of repetitions, a probability that the decoding performance of the UE is affected is small, and it is determined that the second resource is punctured. For example, a quantity of repetitions for transmission of a TB is 8. The TB is transmitted six times before the resource is occupied, and the TB is still not transmitted two times. However, the two times may cause that the UE cannot correctly decode the TB, and it is determined that the second resource is postponed. A quantity of repetitions for transmission of a TB is 32. The TB is transmitted 30 times before the resource is occupied, and the TB is still not transmitted for two times. The two times may cause that a probability that the TB cannot be correctly decoded is low, and it is determined that the second resource is punctured.

In an embodiment, the base station sends second control information. The second control information includes first indication information that can be used to indicate that a resource is punctured or postponed. The first indication information is used to indicate that the second resource is punctured or postponed. For example, the first indication information is a field "Flag". When the first indication information is 1, it indicates that the first resource is punctured; or when the first indication information is 0, it indicates that the first resource is postponed.

Before sending the second control message to the UE, the base station determines the second control message.

In an embodiment, the second control message is DCI carried on an MPDCCH. It should be noted that both the first control message and the second control message may be DCI carried on an MPDCCH, and different control messages may be different DCI. For example, different control information may be distinguished by using different formats of the control information, different lengths of the control information, or different scrambling code sequences of the control information. Alternatively, different control information may be distinguished by using different time domain positions, frequency domain positions, or spatial positions of the control information. The first control information and the second control information in this embodiment of this application may be in a newly defined control information format, or may be in an existing control information format.

The first control information and the second control information may be in a same control information format, or may be in different control information formats. This is not limited in this embodiment of this application.

When the first indication information is used to indicate that the second resource is punctured, a third resource used by the UE for receiving or sending data is a resource other than the second resource in the first resource. For example, as shown in FIG. 5-2, the first resource is the subframe 1 to the subframe 8, and the second resource is the subframe 5 and the subframe 6. When the first indication information indicates that the second resource is punctured, the third resource is the subframe 1 to the subframe 4, the subframe 7, and the subframe 8. The UE receives or sends data in the subframe 1 to the subframe 4, the subframe 7, and the subframe 8.

When the first indication information is used to indicate that the second resource is postponed, the third resource used by the UE to receive or send data includes a resource other than the second resource in the first resource and a fourth resource that follows the first resource and has a same size as the second resource. The fourth resource and the first resource may be consecutive in time domain, or may be inconsecutive (for example, a resource between the first resource and the fourth resource is an invalid resource, for example, a non-BL/CE subframe). In an embodiment, data on the second resource and data on the first resource following the second resource are transmitted by postponing q time domain resource units, where q is equal to a quantity of time domain resource units on the second resource. For example, as shown in FIG. 5-3, the first resource is the subframe 1 to the subframe 8, and the second resource is a subframe 5 and a subframe 6. When the first indication information indicates that the second resource is postponed, data in the subframe 5, the subframe 6, the subframe 7 and the subframe 8 is postponed by two subframes for transmission, and q is equal to 2. A time domain length of the fourth resource is two subframes. In an embodiment, the data on the second resource is postponed to the fourth resource for transmission. For example, as shown in FIG. 5-4, the first resource is the subframe 1 to the subframe 8, and the second resource is the subframe 5 and the subframe 6. When the first indication information indicates that the second resource is postponed, data in the subframe 5 and the subframe 6 is postponed to be transmitted on the fourth resource. A time domain length of the fourth resource is two subframes. It should be noted that "postpone" in this embodiment of this application is an operation on a time domain resource.

In an embodiment, control information further includes second indication information. The second indication information is used to indicate the second resource. For example, the second indication information is a field "subframe number field". In an embodiment, the second indication information may indicate a start moment of the second resource, and a time domain length of the second resource is a preset value. For example, the second indication information may be used to indicate that a start subframe of the second resource is the $M^{th}$ subframe following the last subframe in which the UE receives the second control information, M is a positive integer, and a quantity of subframes occupied by the second resource is a preset value. For example, as shown in FIG. 5-2, if the last subframe in which the UE receives the second control information is a subframe 0, the second indication information indicates that a start moment of the second resource is the subframe 5, and a quantity of subframes occupied by the second resource is 2, the second resource is the subframe 5 and the subframe 6, where M=5.

In another embodiment, the second indication information may be used to indicate a time domain length of the second resource, and a start moment of the second resource is predefined. For example, the second indication information may be used to indicate that a quantity of subframes occupied by the second resource is N, where N is a positive integer, the start moment of the second resource is predefined as an $M^{th}$ subframe starting from a subframe next to the last subframe in which the UE receives the second control information, and M is a positive integer. For example, as shown in FIG. 5-2, the second indication information indicates that the quantity of subframes occupied by the second resource is 2, and the last subframe in which the UE receives the second control information is the subframe 0. The start moment of the second resource is predefined as the 5 subframe starting from a subframe next to the last subframe in which the base station sends the second control information. In this case, the start moment of the second resource is the subframe 5, and the second resource is the subframe 5 and the subframe 6. In another embodiment, the second indication information may be used to indicate a start moment of the second resource and a quantity of occupied subframes. For example, the second indication information may be used to indicate that the start subframe of the second resource is the $M^{th}$ subframe starting from a subframe next to the last subframe in which the UE receives the second control information, and a quantity of subframes occupied by the second resource is N, where M and N are positive integers. For example, as shown in FIG. 5-2, the last subframe in which the UE receives the second control information is the subframe 0, the second indication information indicates that the start moment of the second resource is the subframe 5, the time domain length is 2, and the second resource is the subframe 5 and the subframe 6, where M=5, and N=2.

Figures 1, 6:
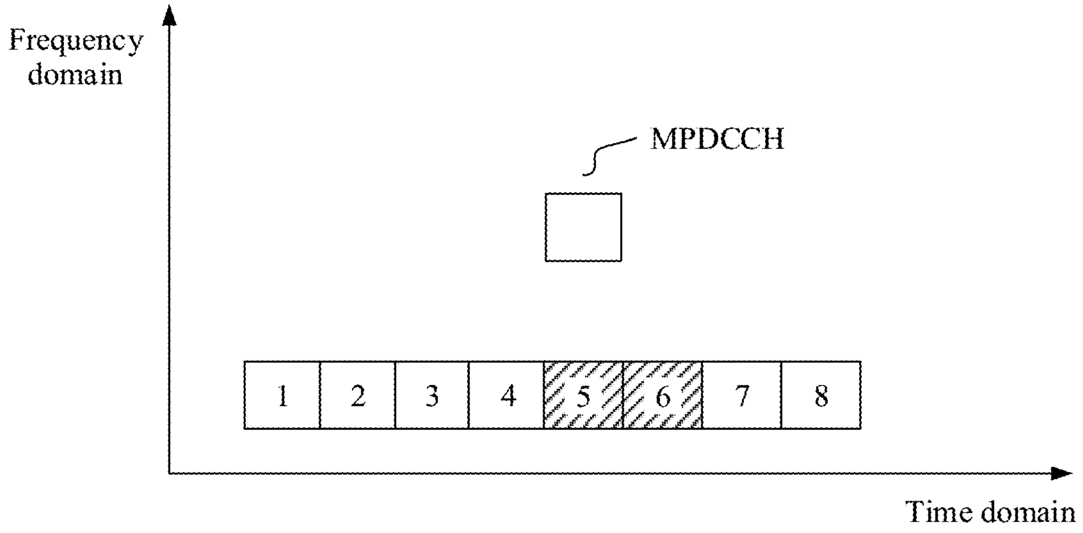
Figures 2, 6:
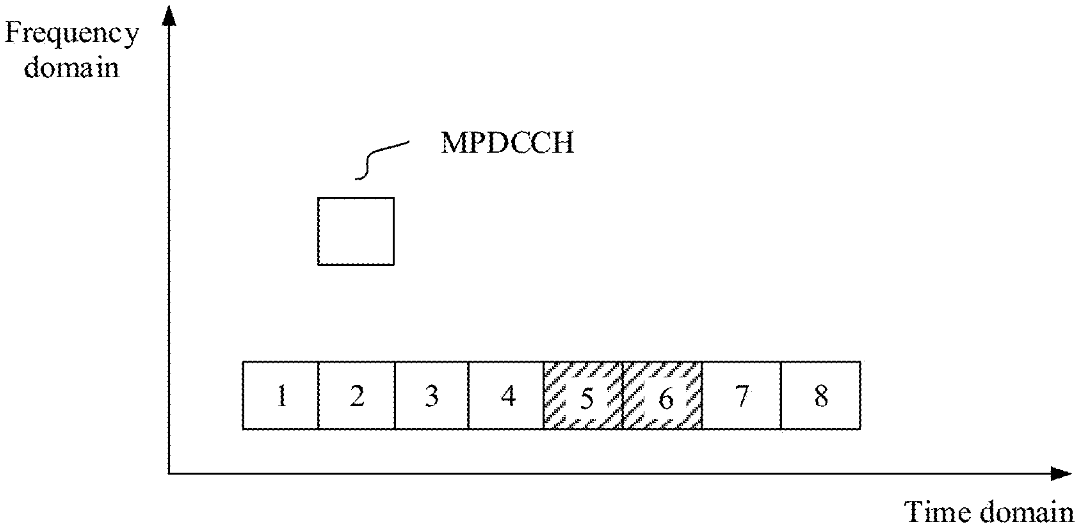

In another embodiment, the start moment of the second resource is a first time at which the UE receives the second control information. For example, as shown in FIG. 6-1, a time at which the UE receives the second control information is the subframe 5, and a start moment of the second resource is the subframe 5. For example, if a time domain length of the second resource is a preset value, and the preset value is 2, the second resource is the subframe 5 and the subframe 6. Certainly, the time domain length of the second resource may alternatively be configured by a base station. This is not limited in this embodiment of this application.

In another embodiment, a start moment of the second resource is a second time after a first time at which the UE receives the second control information, where an interval between the second time and the first time is k, and k is greater than 0. In an embodiment, k is a preset value. In another embodiment, a value of k may be indicated by control information. For example, the value of k is indicated by second indication information. For example, as shown in FIG. 6-2, a time at which the UE receives the second control information is the subframe 2, a start moment of the second resource is the subframe 5, the first time is the subframe 2, the second time is the subframe 5, and an interval between the second time and the first time is three subframes. For example, if a time domain length of the second resource is a preset value, and the preset value is 2, the second resource is the subframe 5 and the subframe 6. Certainly, the time domain length of the second resource may alternatively be configured by a base station. This is not limited in this embodiment of this application.

It should be noted that, in this embodiment of this application, if the base station repeatedly sends the second control information in a plurality of subframes, a moment at which the UE receives the last piece of second control information is used as the first time.

S105. The base station sends the second control information.

After determining the second control information, the base station sends the second control information to the UE.

In an embodiment, the base station specifies that the UE receives the control information at a determined moment. For example, the UE detects the control information at a predetermined detection position. To ensure that a moment at which the UE receives the control information is consistent with a moment at which the base station specifies the UE to receive the control information, the base station may send the control information in advance based on one timing advance.

S106. The UE receives the control information.

The UE receives the control information. To be specific, the UE receives the second control information sent by the base station. In an embodiment, the UE receives the second control information at a moment that is specified by the base station and at which the UE receives the second control information. The UE determines a third resource based on the first indication information in the second control information and the first resource determined based on the first control information, and receives or sends data by using the third resource. When the first indication information is used to indicate that the second resource is punctured, the UE determines that the third resource is a resource other than the second resource in the first resource. When the first indication information is used to indicate that the second resource is postponed, the UE determines that the third resource includes a resource other than the second resource in the first resource and a fourth resource that follows the first resource and has a same size as the second resource. For definitions and determining methods of the second control information, the first resource, the second resource, the third resource, and the fourth resource, refer to descriptions on a base station side. Details are not described herein again.

In an embodiment, the UE may receive the control information through blind detection. For example, the UE detects the control information in at least one detection position of the control information. In an embodiment, the at least one detection position is related to a start position of the first subframe in the first resource. For example, starting from the first subframe in the first resource, control information is detected in every h subframes, where h is a positive integer. For example, h=1, 2, 4, . . . , and a value of h may be a preset value or configured by the base station. In another embodiment, the at least one detection position is periodic and is unrelated to a position of the first resource. For example, a detection period may be configured by the base station in a semi-static manner. For example, when the base station is relatively heavily loaded, there is a relatively high probability that UE with a higher priority cannot be scheduled. In this case, a detection period of the UE may be configured to be relatively short. When the base station is relatively lightly loaded, there is a relatively low probability that UE with a higher priority cannot be scheduled. In this case, a detection period of the UE may be configured to be relatively long. For example, the detection period may alternatively be preset.

It should be noted that the base station may send the second control information at one detection position in the at least one detection position, may also send the second control information at a plurality of detection positions in the at least one detection position, or may also send the second control information at all detection positions in the at least one detection position. In an embodiment, the UE may use the second control information received at the last time.

Embodiments of this application provide a data transmission method and a control information sending method, to indicate, by sending control information, a resource used for data transmission. Compared with the current technology, in a scenario in which a TB is repeatedly transmitted, a resource of a very long time is pre-allocated to one UE for data transmission, and no resource can be allocated to another UE that requests a resource. Alternatively, a part of the resource pre-allocated to one UE for data transmission is allocated to UE with a higher priority for use, and resource compensation is not performed on the current UE. Therefore, a correct data transmission method of the current UE cannot be ensured. According to the data transmission method and the control information sending method provided in the embodiments of this application, control information sent to current UE indicates that a resource occupied by the UE with a higher priority is punctured or postponed, and the current UE determines, based on the control information, a resource used for data transmission, so that a service of the UE with a higher priority can be ensured, and current data receiving performance of the UE and the base station is ensured. In addition, according to the data transmission method and the control information sending method provided in the embodiments of this application, a part of a resource reserved for repeated transmission of the TB can be allocated to the UE with a higher priority. This improves scheduling flexibility of the base station.

The foregoing mainly describes the solutions provided in the embodiments of this application from a perspective of interaction between the first communications device and the second communications device. It may be understood that, to implement the foregoing functions, the first communications device and the second communications device include a corresponding hardware structure and/or software module for performing each of the functions. A person skilled in the art should easily be aware that, with reference to the examples described in the embodiments disclosed in this specification, units and algorithm operations may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the embodiment goes beyond the scope of this application.

In the embodiments of this application, division into function modules may be performed on the first communications device and the second communications device based on the foregoing method examples. For example, each function module may be obtained through division corresponding to each function, or two or more functions may be integrated into one processing module. The integrated module may be implemented in a form of hardware, or may be implemented in a form of a software function module. It should be noted that, in the embodiments of this application, division of the modules is an example and is merely logical function division. In an embodiment, another division manner may be used. An example in which function modules are divided based on functions is used below for description.

Figure 7:
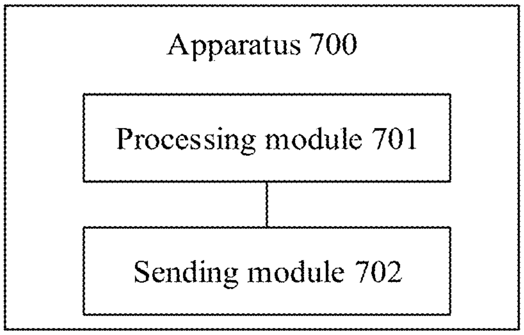
FIG. 7 is a schematic structural diagram 1 of a communications device according to an embodiment of this application.

FIG. 7 is a schematic diagram of a logical structure of an apparatus 700 according to an embodiment of this application. The apparatus 700 is a first communications device configured to perform a control information sending method. The apparatus 700 may be a network device or UE, and can implement a function of the first communications device in the method provided in the embodiments of this application. Alternatively, the apparatus 700 may be an apparatus that can support the network device or the UE in implementing a function of the first communications device in the method provided in the embodiments of this application. The apparatus 700 may be a hardware structure, a software module, or a combination of a hardware structure and a software module. The apparatus 700 may be implemented by a chip system. In this embodiment of this application, the chip system may include a chip, or may include a chip and another discrete component. As shown in FIG. 7, the apparatus 700 includes a processing module 701 and a sending module 702. The processing module 701 may be configured to perform S101 and/or S104 in FIG. 4, and/or perform other operations described in this application. The sending module 702 may be configured to perform S102 and/or S105 in FIG. 4, and/or perform other operations described in this application. The processing module may also be referred to as a processing unit or another name, and the sending module may also be referred to as a sending unit or another name.

All related content of the operations in the foregoing method embodiments may be cited in function descriptions of a corresponding function module. Details are not described herein again.

Figure 8:
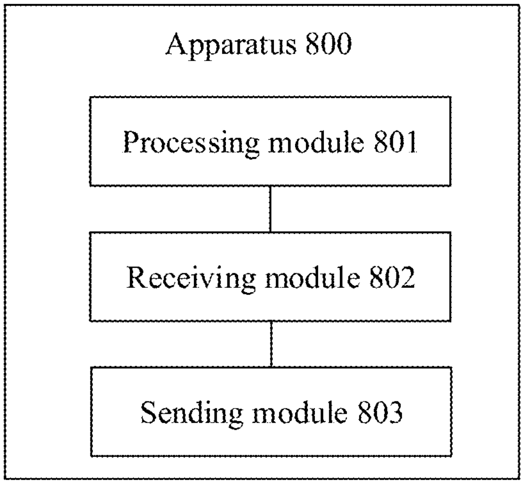
FIG. 8 is a schematic structural diagram 2 of a communications device according to an embodiment of this application.

FIG. 8 is a schematic diagram of a logical structure of an apparatus 800 according to an embodiment of this application. The apparatus 800 is a second communications device configured to perform a data transmission method. The apparatus 800 may be UE, and can implement a function of the second communications device in the method provided in the embodiments of this application. Alternatively, the apparatus 800 may be an apparatus that can support the UE in implementing a function of the second communications device in the method provided in the embodiments of this application. The apparatus 800 may be a hardware structure, a software module, or a combination of a hardware structure and a software module. The apparatus 800 may be implemented by a chip system. In this embodiment of this application, the chip system may include a chip, or may include a chip and another discrete component. As shown in FIG. 8, the apparatus 800 includes a processing module 801, a receiving module 802, and a sending module 803. The processing module 801 may be configured to perform S103 and/or S106 in FIG. 4, and/or perform other operations described in this application. The receiving module 802 may be configured to perform S103 and/or S106 in FIG. 4, and/or perform other operations described in this application. The sending module 803 may be configured to perform the data sending function in S106 in FIG. 4, and/or perform other operations described in this application. The processing module may also be referred to as a processing unit or have another name, the receiving module may also be referred to as a receiving unit or have another name, and the sending module may also be referred to as a sending unit or have another name.

All related content of the operations in the foregoing method embodiments may be cited in function descriptions of a corresponding function module. Details are not described herein again.

In this embodiment, the apparatus 700 or the apparatus 800 may be presented in a form of function modules obtained through division in an integrated manner. The "module" herein may be a specific ASIC, a circuit, a processor and a storage device that execute one or more software or firmware programs, an integrated logic circuit, and/or another component that can provide the foregoing functions.

In an embodiment, the apparatus 700 or the apparatus 800 may be in a form shown in FIG. 3.

For example, the processor 301 in FIG. 3 may invoke the computer-executable instruction stored in the memory 303, so that the apparatus 700 or the apparatus 800 performs the control information sending method and the data transmission method in the foregoing method embodiments.

In an embodiment, functions/processes of the sending module 702 in FIG. 7, and the receiving module 802 and the sending module 803 in FIG. 8 may be implemented by using the communications interface 204 in FIG. 3. A function/process of the processing module 701 in FIG. 7 and the processing module 801 in FIG. 8 may be implemented by using the processor 301 in FIG. 3 to invoke the computer-executable instruction stored in the memory 303.

The apparatus provided in this embodiment of this application may be configured to perform the foregoing data transmission method and the foregoing control information sending method. Therefore, for technical effects that can be achieved by the apparatus, refer to the foregoing method embodiments. Details are not described herein again.

A person of ordinary skill in the art may understand that all or some of the operations of the foregoing methods may be implemented by a program indicating relevant hardware. The program may be stored in a computer-readable storage medium. The storage medium includes a ROM, a RAM, an optical disc, and the like.

An embodiment of this application further provides a storage medium. The storage medium may include a memory 303.

For explanations and beneficial effects of related content in any one of the foregoing provided apparatuses, refer to the corresponding method embodiment provided above. Details are not described herein again.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When computer program instructions are loaded and executed on a computer, the procedure or functions according to the embodiments of this application are all or partially generated. The computer may be a general-purpose computer, a special-purpose computer, a computer network, a network device, user equipment, or another programmable apparatus. The computer instructions may be stored in a computer-readable storage medium, or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital video disc (DVD), a semiconductor medium (for example, a solid-state drive (SSD)), or the like.

Although this application is described with reference to the embodiments, in a procedure of implementing this application that claims protection, a person skilled in the art may understand and implement another variation of the disclosed embodiments by viewing the accompanying drawings, disclosed content, and the accompanying claims. In the claims, "comprise" (comprising) does not exclude another component or another operation, and "a" or "one" does not exclude a case of a plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and the accompanying drawings are merely example descriptions of this application defined by the appended claims, and are intended to cover any of or all modifications, variations, combinations, or equivalents within the scope of this application. It is clear that a person skilled in the art can make various modifications and variations to this application without departing from the spirit and scope of this application. If these modifications and variations of this application fall within the scope of the claims of this application and their equivalent technologies, this application is also intended to cover these modifications and variations.

What is claimed is:

1. A data transmission method, comprising:

determining, by a communications device, a first resource used for receiving or sending data;

receiving, by the communications device, control information comprising first indication information indicating that a second resource is postponed, wherein the first resource comprises the second resource; and determining, by the communications device, a third resource based on the first indication information and the first resource, and receiving or sending the data by using the third resource comprising:

a resource other than the second resource in the first resource, and a fourth resource that follows the first resource having a same size as the second resource.

2. The method according to claim 1, wherein the control information further comprises second indication information indicating the second resource.

3. The method according to claim 1, wherein the receiving of the control information by the communications device comprises:

detecting, by the communications device, the control information in at least one detection position of the control information related to a start position of a first subframe in the first resource.

4. The method according to claim 1, wherein a start moment of the second resource is a first time the communications device receives the control information or a second time after the first time.

5. The method according to claim 1, wherein the control information is carried on a machine type physical downlink control channel (MPDCCH).

6. A communications device, comprising:

a processor, configured to determine a first resource used for receiving or sending data;

a receiver, configured to receive control information comprising first indication information indicating that a second resource is postponed, and wherein the first resource comprises the second resource; and the processor is further configured to determine a third resource based on the first indication information and the first resource, wherein the third resource comprises:

a resource other than the second resource in the first resource, and a fourth resource that follows the first resource having a same size as the second resource; and the receiver is further configured to receive the data by using the third resource; or a transmitter, configured to send the data by using the third resource.

7. The device according to claim 6, wherein the receiver is further configured to:

detect the control information in at least one detection position of the control information related to a start position of a first subframe in the first resource.

8. The device according to claim 6, wherein the control information is carried on a machine type physical downlink control channel (MPDCCH).

9. A non-transitory computer-readable medium having instructions stored therein, which when executed by a processor, cause the processor to perform operations, the operations comprising:

determining a first resource used for receiving or sending data;

receiving control information comprising first indication information indicating that a second resource is postponed, and wherein the first resource comprises the second resource; and determining a third resource based on the first indication information and the first resource, and receiving or sending the data by using the third resource comprising:

a resource other than the second resource in the first resource, and a fourth resource that follows the first resource having a same size as the second resource.

10. The non-transitory computer-readable medium according to claim 9, wherein the operations further comprise:

detecting the control information in at least one detection position of the control information related to a start position of a first subframe in the first resource.

11. The non-transitory computer-readable medium according to claim 9, wherein the control information is carried on a machine type physical downlink control channel (MPDCCH).

12. A communications system, comprising:

a first communications device, configured to send control information to a second communications device, wherein the control information comprises first indication information indicating that a second resource is postponed; and the second communications device, configured to determine a first resource used for receiving or sending data, wherein the first resource comprises the second resource; receive the control information; and determining a third resource based on the first indication information and the first resource, and receiving or sending the data by using the third resource comprising:

a resource other than the second resource in the first resource, and a fourth resource that follows the first resource having a same size as the second resource.

13. The system according to claim 12, wherein the control information is carried on a machine type physical downlink control channel (MPDCCH).

14. The system according to claim 12, wherein the second communications device is further configured to:

detect the control information in at least one detection position of the control information related to a start position of a first subframe in the first resource.

* * * * *